United States Patent
Wong et al.

(10) Patent No.: US 10,397,743 B2
(45) Date of Patent: Aug. 27, 2019

(54) CONTEXTUAL INFORMATION USAGE IN SYSTEMS THAT INCLUDE ACCESSORY DEVICES

(71) Applicant: Fitbit, Inc., San Francisco, CA (US)

(72) Inventors: Yoon Kean Wong, Redwood City, CA (US); Andrew James Witte, Palo Alto, CA (US); Matthew David Hornyak, Oakland, CA (US); Eric Bernard Migicovsky, Palo Alto, CA (US); Mark Solomon, San Jose, CA (US)

(73) Assignee: FITBIT, INC., San Francisco, CA (US)

( * ) Notice: Subject to any disclaimer, the term of this patent is extended or adjusted under 35 U.S.C. 154(b) by 52 days.

(21) Appl. No.: 15/701,345

(22) Filed: Sep. 11, 2017

(65) Prior Publication Data
US 2017/0374523 A1 Dec. 28, 2017

Related U.S. Application Data

(63) Continuation of application No. 14/713,608, filed on May 15, 2015, now Pat. No. 9,763,049.
(Continued)

(51) Int. Cl.
*H04W 4/02* (2018.01)
*H04W 4/80* (2018.01)
(Continued)

(52) U.S. Cl.
CPC ......... *H04W 4/025* (2013.01); *H04M 1/7253* (2013.01); *H04M 1/72569* (2013.01);
(Continued)

(58) Field of Classification Search
USPC ........................................ 455/557
See application file for complete search history.

(56) References Cited

U.S. PATENT DOCUMENTS 8,684,900 B2 4/2014 Tran
8,764,651 B2 7/2014 Tran
(Continued)

FOREIGN PATENT DOCUMENTS

WO WO 12/170586 12/2012
WO WO 12/170924 12/2012
(Continued)

OTHER PUBLICATIONS

Natarajan, Nagarajan, et al., "Which App Will You Use Next? Collaborative Filtering with Interactional Context," RecSys '13, Oct. 12-16, 2013, Hong Kong, China, http://dx.doi.org/10.1145/2507157.2507186.
(Continued)

*Primary Examiner* — Ganiyu A Hanidu
(74) *Attorney, Agent, or Firm* — Hogan Lovells US LLP

(57) ABSTRACT

Techniques are disclosed for using contextual information to determine an appropriate response in a system that includes a device paired with an accessory device. The contextual information can be sourced from local sensors, received communications, and information stored on a device within the system. Stored parameters in the system allow flexibility and configurability in evaluating the contextual information. Using feedback obtained after actions taken based on the contextual information allows the system to adapt to better meet the needs of the user.

20 Claims, 6 Drawing Sheets

Related U.S. Application Data

(60) Provisional application No. 61/993,362, filed on May 15, 2014.

(51) Int. Cl.
    *H04M 1/725*     (2006.01)
    *H04W 88/02*     (2009.01)
    *H04W 4/04*     (2009.01)

(52) U.S. Cl.
    CPC ............... *H04W 4/02* (2013.01); *H04W 4/80* (2018.02); *H04W 88/02* (2013.01); *H04M 2250/10* (2013.01); *H04W 4/04* (2013.01)

(56) References Cited

U.S. PATENT DOCUMENTS

| | | | |
|---|---|---|---|
| 2002/0115478 A1* | 8/2002 | Fujisawa | H04M 1/6505 455/567 |
| 2008/0287751 A1 | 11/2008 | Stivoric et al. | |
| 2009/0144509 A1 | 6/2009 | Wong | |
| 2012/0071151 A1 | 3/2012 | Abramson | |
| 2013/0040610 A1* | 2/2013 | Migicovsky | H04L 1/1867 455/412.2 |
| 2014/0180022 A1 | 6/2014 | Stivoric et al. | |
| 2014/0214924 A1* | 7/2014 | Cha | H04N 21/41407 709/203 |
| 2014/0246498 A1 | 9/2014 | Proud | |
| 2015/0026647 A1 | 1/2015 | Park et al. | |
| 2015/0164416 A1* | 6/2015 | Nothacker | A61B 5/082 340/573.1 |
| 2015/0170504 A1* | 6/2015 | Jooste | A61B 5/6898 340/539.12 |
| 2016/0187153 A1* | 6/2016 | Johnson | G16H 40/63 701/500 |

FOREIGN PATENT DOCUMENTS

| | | |
|---|---|---|
| WO | WO 12/171032 | 12/2012 |
| WO | WO 15/127067 | 8/2015 |
| WO | WO 16/003269 | 1/2016 |

OTHER PUBLICATIONS

Yan, Tingxin, et al., "Fast App Launching for Mobile Devices Using Predictive User Context," MobiSys '12, Jun. 25-29, 2012, Low Wood Bay, Lake District, UK.

\* cited by examiner

CONTEXTUAL INFORMATION USAGE IN SYSTEMS THAT INCLUDE ACCESSORY DEVICES

RELATED APPLICATIONS

This application is a continuation of U.S. patent application Ser. No. 14/713,608, filed on May 15, 2015, titled "CONTEXTUAL INFORMATION USAGE IN SYSTEMS THAT INCLUDE ACCESSORY DEVICES," which claims the benefit of U.S. Provisional Patent Application No. 61/993,362, filed on May 15, 2014, titled "CONTEXTUAL INFORMATION USAGE IN SYSTEMS THAT INCLUDE ACCESSORY DEVICES." The disclosures of these applications are herein incorporated by reference in their entirety for all purposes.

TECHNICAL FIELD

The disclosure herein relates generally to devices used in systems that include a network connected mobile device, such as a smartphone, and an associated device, such as a smartwatch.

BACKGROUND

Mobile devices such as laptop computers, smartphones, and tablets are often paired or associated with complementary accessory devices such as, for example, smartwatches or other wearable accessory devices. The accessory devices work with the mobile devices to provide users with increased utility by, for example, allowing the user to view information on the accessory device instead of having to look at the mobile device, which may be in the user's pocket, briefcase, or purse.

As more users rely on accessory devices such as smartwatches, new software program applications, commonly referred to as "apps," are being developed that take advantage of the different features provided by the mobile devices and the accessory devices. Such applications provide the user with many options in terms of what the user can view on the respective displays of the devices as well as how alerts (e.g. email, text messages, caller ID notifications) are delivered to the user.

In many systems, the mobile device is able to communicate with the accessory device over a wireless communications link. For example, Bluetooth is a common short-distance wireless protocol that allows smartphones to interact with related accessory devices such as smartwatches, hands-free systems in cars, home audio systems, etc.

As mobile devices and accessory devices continue to become more complex, additional options for enhancing the user experience are enabled. Therefore, it is desirable to provide techniques to allow configurable and flexible interactions between the devices in such systems such that the capabilities of the different devices can be efficiently utilized with minimal prompting by the user.

DETAILED DESCRIPTION

Figure 1:
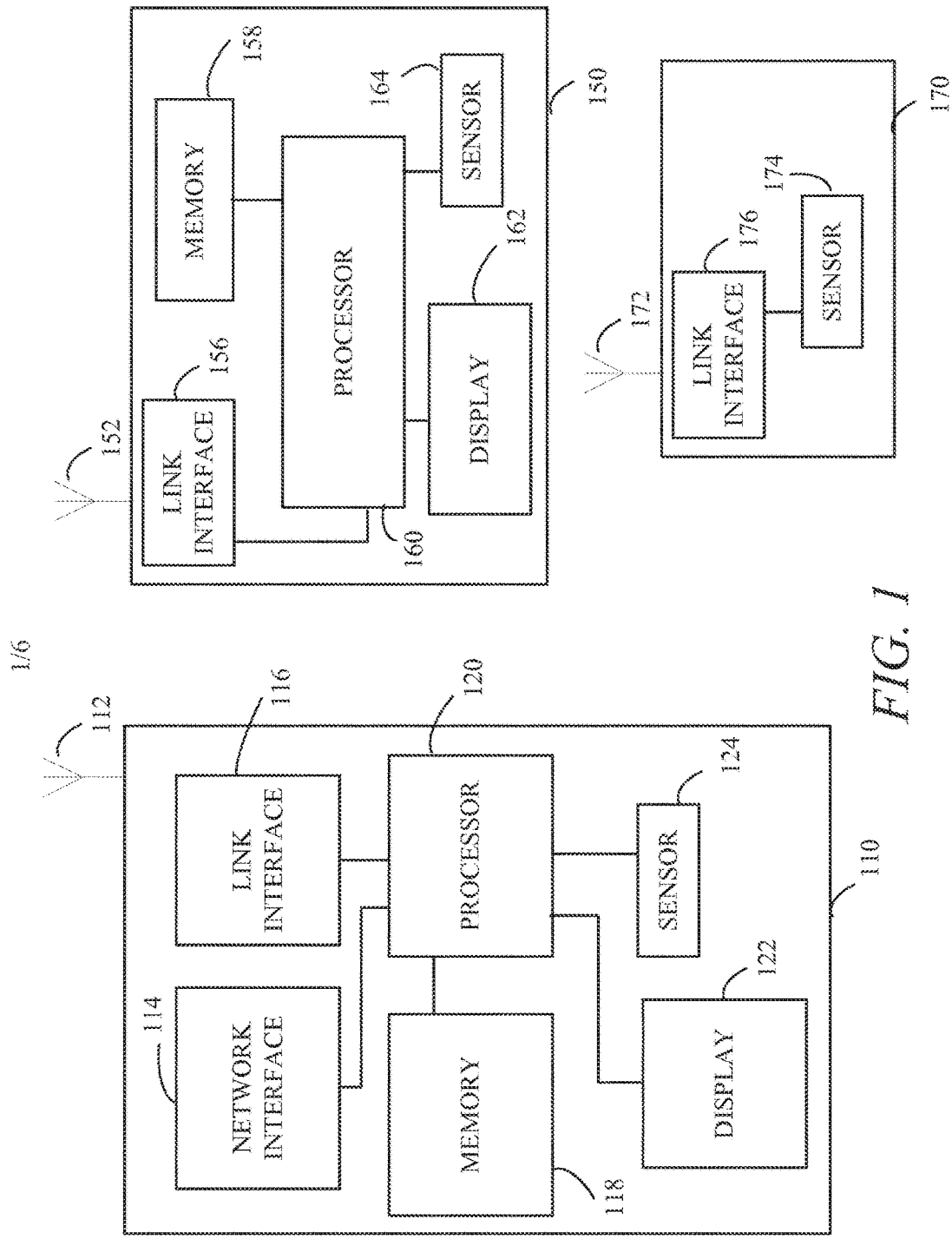
FIG. 1 is a block diagram of devices in a system in accordance with an exemplary embodiment.

The following detailed description is merely illustrative in nature and is not intended to limit the embodiments of the subject matter or the application and uses of such embodiments. Any implementation described herein as exemplary is not necessarily to be construed as preferred or advantageous over other implementations.

For simplicity and clarity of illustration, the Figures depict the general methodology and/or manner of construction of the various embodiments. Descriptions and details of well-known features and techniques may be omitted to avoid unnecessarily obscuring other features.

Terms of enumeration such as "first," "second," "third," and the like may be used for distinguishing between similar elements and not necessarily for describing a particular spatial or chronological order. These terms, so used, are interchangeable under appropriate circumstances.

The terms "comprise," "include," "have" and any variations thereof are used synonymously to denote non-exclusive inclusion. The term "exemplary" is used in the sense of "example," rather than "ideal."

In the interest of conciseness, conventional techniques, structures, and principles known by those skilled in the art may not be described herein, including, for example, the circuits supporting communications links between the various devices described herein.

During the course of this description, like numbers may be used to identify like elements according to the different Figures that illustrate the various exemplary embodiments. It is to be understood by any skilled in the art that the methods described below can be implemented on a computing device employing software modules and one or more processors and that the terms method, process, step, and action can be used to describe events occurring in one or more software modules implemented on a computing device.

Devices such as smartphones, laptops, and tablets include significant computing power that allows users to accomplish many tasks that would not have been possible with previous generation devices. Such devices typically provide a connection to large networks, such as the Internet, that allow users to transfer data associated with certain applications running on the devices. Such devices also provide connections to user communication services through, for example, a cellular network or the Internet, that allow user communication by voice, messaging, or email.

Associated accessory devices are designed to work in coordination with devices such as smartphones, where the accessory devices may not have the same amount of computing power or connectivity features. For example, an accessory device such as a smartwatch may provide more limited resources in terms of memory and may not provide a direct connection to cellular services or the Internet. Instead, such accessory devices can leverage, for example, a smartphone to provide access to the Internet and cellular service, thereby enabling support for text messages, email, and telephone and Internet access. Other examples of accessory devices include wearable devices such as bracelets, pendants, other forms of jewelry, headsets, belts, clothing, eyeglasses, and earpieces. Accessory devices can also be discrete devices not worn by the user, such as a remote control. In an example in which an accessory device is paired with another device, both devices include circuitry that allows for one or more communications links to be established between the devices for data transfers.

In embodiments where an accessory device (e.g. smartwatch) is paired with a another device (e.g. smartphone), each of the two devices may include unique sensors, stored contextual information, and access to other devices from which further contextual information can be obtained. In such embodiments, it is desirable to present content that is relevant to the user with minimal user action required. For example, if it is detected that the user has turned his or her wrist to look at the smartwatch, it is desirable to display content on the smartwatch that is relevant to the user at that particular point in time. What information is displayed can be determined based on the contextual information reflecting the state of the user and the user's environment at the particular point in time at which the user looks at the smartwatch. In other embodiments, the response to a particular user action may be something other than displaying a particular set of information. For example, an application may be launched, a particular song played, or some specific information may be sent from the smartwatch or smartphone to another device.

A number of techniques for using such multiple-device systems are described herein. While many of the examples provided pertain to a smartwatch used in combination with a smartphone, such examples should not be viewed as limiting. For example, other accessory devices, including those listed above, can be used, and other mobile devices such as a tablet or laptop may also be a part of such systems. Moreover, the techniques described herein may be appropriate for the accessory device, the device with which the accessory device is paired, or systems that include both devices.

In such systems, coordination between the different devices without requiring user input is beneficial. In one example embodiment, an application on a smartphone has a corresponding portion that runs on a smartwatch. In other embodiments, there is a corresponding complementary application on the smartwatch that enhances the execution of an application on the smartphone. In such embodiments, when the application on the smartphone is activated, or "launched," the related portion or complementary application on the smartwatch is automatically activated in response to information sent from the smartphone. In other embodiments, an application on the smartphone may already be running, and, based on contextual information received or self-recognized, the smartphone may determine that an application should be launched, or some information should be relayed to, the smartwatch or other accessory device. As such, a user is not required to manually provide input to the smartwatch in order to activate the relevant software that works with the application on the smartphone.

In other embodiments that coordinate operations of the devices in such systems, a determination may be made by an accessory device, such as a smartwatch, that a particular application should be activated. Such a determination may be based on contextual information provided to the smartwatch, where such contextual information can include a variety of information that may be relevant to the user. In some embodiments, the contextual information is based on sensors included in the accessory device, whereas in other embodiments, the contextual information may be provided over a wireless link or through some other communication means. In one example, contextual information may be provided by a GPS sensor on a smartphone paired with the accessory device, whereas in other examples, the contextual information may be sourced from a remote device and received by the smartphone over a network before being forwarded to the accessory device. In an example in which the accessory device is a smartwatch or other wearable device, the wearability of the device provides additional benefits in terms of the particular context that can be ascertained by the device. For example, the body temperature of the wearer can be sensed by a worn accessory device, whereas such body temperature sensing would not be possible using a smartphone carried in a jacket pocket or purse. Similarly, for other accessory devices such as glasses or headphones, head movement and positioning may be tracked. Similarly, an earpiece could provide contextual information related to heart rate, blood oxygen content, or bone conducted audio. By using contextual information in conjunction with parameters stored on the smartwatch, a determination can be made as to whether one or more applications should be activated on the smartwatch.

In other embodiments, the contextual information and stored parameters are used to determine an appropriate response by the smartwatch, where examples of such a response include sending information to a related device, displaying information to the user based on the contextual information and stored parameters, and providing an alert to the user in some non-visual form. The parameters stored on the smartwatch that are used to process the contextual information may include parameters associated with an application, user configurable parameters, or fixed parameters included with the accessory device prior to receipt of the device by the user.

The techniques disclosed herein also include using feedback to determine whether or not the actions taken based on the contextual evaluation were beneficial. Based on the feedback, the stored parameters within the device can be updated in order to better realize the actual needs of the user. For example, if the user quickly moves away from a displayed indication to some other information, that may indicate that the information was not helpful to the user and the stored parameters can be updated accordingly. Thus, the feedback can be used to train the system to behave in a manner that maximizes the benefit to the user based on actual user behavior and not expectations alone. In addition to using the feedback internally, such feedback can be output by the device for use by others. For example, parameters included with an initial version of an application that determine the resulting actions based on certain contextual information may be later modified if feedback from one or many users is taken into account.

Other embodiments discussed herein provide a platform for developers of third-party applications, where such third-party applications are given convenient, easy-to-use access to contextual information, thereby enabling the third-party applications to utilize such contextual information. The platform also provides the third-party applications with a variety of possible responses in terms of providing alerts to users, displaying information, or activating other applications based on the contextual information. By providing such a platform, third-party application developers are better able to leverage the capabilities of the system that includes a device paired with an accessory device.

FIG. 1 illustrates a block diagram of a system that includes devices 110, 150, and 170. Each of devices 110, 150, and 170 includes at least one antenna 112, 152, and 172, respectively, which facilitates transmission and reception of wireless signals. Device 110, which in an example embodiment is one of a smartphone, tablet, laptop, or other computing device, includes a display 122 that presents an interface that allows a user to interact with the device. In other embodiments, device 110 does not include a display, and instead provides the ability to connect to an external display or some other means of interacting with a user. Device 110 includes a network interface 114 that allows the device 110 to connect to a network such as the Internet. The network interface 114 may include a WIFI interface, a cellular interface, as well as other interfaces that allow for communication with an external network. Device 110 also includes a link interface 116 for facilitating wireless communications links with devices 150 and 170 as well as other devices having the ability to establish such links. In one embodiment, the link interface 116 supports Bluetooth links, which may include both Bluetooth Classic (BTC) and Bluetooth Low Energy (BLE) links. In another embodiment, link interface 116 may support a WIFI connection with one or more of devices 150 and 170. As one of ordinary skill in the art appreciates, network interface 114 and link interface 116 may be circuits that include discrete components or are integrated onto one or more chips.

Device 110 includes a sensor 124, where the sensor 124 provides contextual information to the device 110. While the embodiment depicted in FIG. 1 includes a single sensor 124, other embodiments may include many sensors or no sensors. Examples of sensors that provide contextual information include GPS, gyroscope, accelerometer, magnetometer, microphone, proximity sensor, illumination sensor, altimeter, gravity sensor, temperature sensor, pressure sensor, humidity sensor, orientation sensor, etc. Such sensors can provide the device 110 with information about the user's environment as well as position/movement of the device 110 in that environment.

Device 110 typically includes input/output (I/O) capability based on, for example, a keyboard or touchscreen. Device 110 also includes a processor 120 and memory 118. The device 110 may include one or more processors 120, such that the processor 120 is a single central-processing unit, or a plurality of processing units, commonly referred to as a parallel processing environment. The processor 120 may be a microcontroller that includes other aspects of the device 110, including, for example, memory 118, the network interface 114, and the link interface 116.

The processor 120 in device 110 is capable of executing a computer program to execute a computer process. Data and program files may be input to the device 110, which reads the files and executes the programs therein. Programs and configuration parameters may be stored in memory 118. Also contemplated herein is a non-transitory computer readable medium that stores a program that causes the processor 120 to execute a process, where the process may include the steps shown and described below with respect to, for example, FIG. 6. Such a program or a part thereof can be stored in various types of media for retention, distribution, etc. The contemplated tangible computer-readable memory media include memory devices (SDRAM, DDR SDRAM, RDRAM, SRAM, flash memory, and various types of ROM, etc.), as well as storage media or memory media such as magnetic (e.g., disk) or optical media (e.g., CD, DVD, and related technologies, etc.). The tangible computer-readable memory media may be either volatile or nonvolatile memory.

Device 150, which in some embodiments is a smartwatch or other accessory device such as those listed above, also includes a display 162 that may present an interface that allows a user to interact with the device. In other embodiments, device 150 does not include a display. Device 150 includes a link interface 156 for facilitating communications links with device 110 and other devices having the ability to establish such links, including, for example, device 170. In one embodiment, the link interface 156 supports both BTC and BLE links. Device 150 includes input 164, which allows a user to provide input to the device 150. One of ordinary skill in the art appreciates that various buttons, wheels, touchscreens, and other input mechanisms are well known and various instances or combinations of such input mechanisms can be included in device 150. Thus, while not shown, device 150 may also include additional user input/output mechanisms.

Device 150, while shown to be simpler than device 110 in that it lacks a network interface, may in some embodiments include a network interface that allows the device 150 to connect to a network such as the Internet. As is the case with network interface 114, the network interface that may be present in device 150 may be a WIFI interface, a cellular interface, or some other interface that allows for communication with the external network. Thus, in some embodiments, device 150 may share a similar or same level of connectivity to networks as device 110, yet the two devices may still communicate directly with each other over a communications interface to support the various embodiments disclosed herein.

Device 150 includes a sensor 164, where sensor 164 provides contextual information to the device 150. While the embodiment depicted in FIG. 1 includes a single sensor 164, other embodiments may include many sensors or no sensors in device 150. In addition to the example sensors listed above with respect to sensor 124 in device 110, the sensor 164 included in device 150 can leverage the expectation that accessory device is worn by, or affixed to, the user in a predetermined manner. Thus, sensor 164 can sense certain aspects relating to the user of the system that the sensor 124 included in device 110 may be incapable of sensing. For example, the information sensed by sensor 164 may be based on the device 150 being physically in contact with the user of the device 150. Examples of such sensors include those which might sense the body temperature of the user, heart rate of the user, bone conducted audio, speed and direction of motion of the body part to which the device 150 is attached, orientation of the body part to which the device 150 is attached, and other biometric information relating to the user that can be analyzed to determine a state of the user, including, for example, the user's mood or state of agitation. Thus, sensor 164 may be able to sense classes of stimuli not detectable by sensor 124 included in device 110. For example, sensor 164 may be used to determine that the user is running, swimming, playing catch with a ball, riding a bicycle, etc.

The device 150 includes a processor 160 and memory 158, which like processor 120 and memory 118 of device 110 may include many variations of processor(s) or memories. As was the case with device 110, device 150 stores or receives software that, when executed by the processor 160, allows the device 150 to practice some or all of the actions discussed below in the context of, for example, FIGS. 2-5.

Each of devices 110 and 150 may also store information relating to the user such as calendar events that can be compared with a time keeper, contacts or identities of people that the user associates with, a list of favorite restaurants, health information (e.g. expected blood pressure or heart rate), expected times at work/home/sleep, preferred transportation means (e.g. train, bus, subway), etc. Such additional user-specific information can be used in conjunction with other contextual information to select an appropriate response when one or more of the devices 110 and 150 determine that an application should be launched or certain information should be displayed or provided in some other manner.

Software for execution by the processor 120 can include applications downloaded from the network, where, when extracted or executed by the processor 120 cause additional data to be sent to device 150 for storage in memory 158 and execution by processor 160. Such applications thereby include execution aspects to be performed by device 110 as well as device 150. In one example, an application, which includes aspects that execute on each of devices 110 and 150, relates to receiving and processing data from the Internet. In such an example, the application software running on device 110 causes the device 110 to selectively forward data to the device 150 over one or more of the communications links. A portion of the application software specific to the device 150 that is executed by the processor 160 may then use the transferred data to display information or perform some other action.

Thus, devices 110 and 150 work together to provide the user with an experience that takes advantage of the capabilities of both devices. In such a system, applications provided by third-party developers can leverage sensors included in each of the devices 110 and 150 in addition to other contextual information received or stored by the devices. As an example, an application that monitors a runner's exercise routine can provide mileage calculations using a GPS sensor on a smartphone, while determining the number of strides taken based on accelerometer included in a smartwatch worn by the runner.

FIG. 1 also depicts device 170, which includes a sensor 174 coupled to the link interface 176. Device 170 is a potential additional source of contextual information provided to the system that includes devices 110 and 150. While depicted in FIG. 1, it should be understood that additional devices such as device 170 may or may not be present in a system according to various embodiments described herein. For example, additional contextual information may be provided to the devices 110 and 150 from the network rather than from a discrete device such as device 170. Specifically, contextual information can be pushed by services accessible by the network, where pushed contextual information can then be used by one or more of devices 110 and 150. Moreover, while only a single device 170 including a single sensor 174 is shown in FIG. 1, it should be understood that multiple such devices, each including one or more sensors or other means for providing contextual information, can be included in different embodiments.

In an example embodiment, device 170 may constitute a stationary sensor such as a thermometer that includes a Bluetooth connection thereby providing a means to provide temperature contextual information to one or more of devices 110 and 150. For example, device 170 may be placed on the exterior of the house thereby enabling wireless monitoring of an external temperature. Such contextual information could be used by the devices 110 and 150 in conjunction with scheduling information to determine, for example, that the user's car should be started on a cold day at a particular time such that it is warm when the user needs to leave for an appointment.

In other example embodiments, device 170 may represent another device similar to device 110 or device 150. For example, device 170 may represent another user's smartphone, where information on the other user's smartphone may be provided to the system including devices 110 and 150 for use therein. For example, devices 110 and 150 may take into account the identity of the user corresponding to device 170 when determining an appropriate response to take based on other contextual information received and processed.

In yet other embodiments, device 170 may represent a beacon or other device indicating relative positioning or geo-location. For example, the device 170 may broadcast information relating to the identity of a particular store or transit station. In addition to providing information as to where a particular user may be located, the device 170 may provide additional contextual information such as the availability of particular goods in the store, special offers, or, in the case of a transit station, scheduling or current transit status information.

The inclusion of device 170 is in FIG. 1 represents the availability of external sources of contextual information or other information that may be used by the system including devices 110 and 150. Although a few examples of devices that provide such additional information are provided, those examples should not be viewed as limiting.

Figure 2:
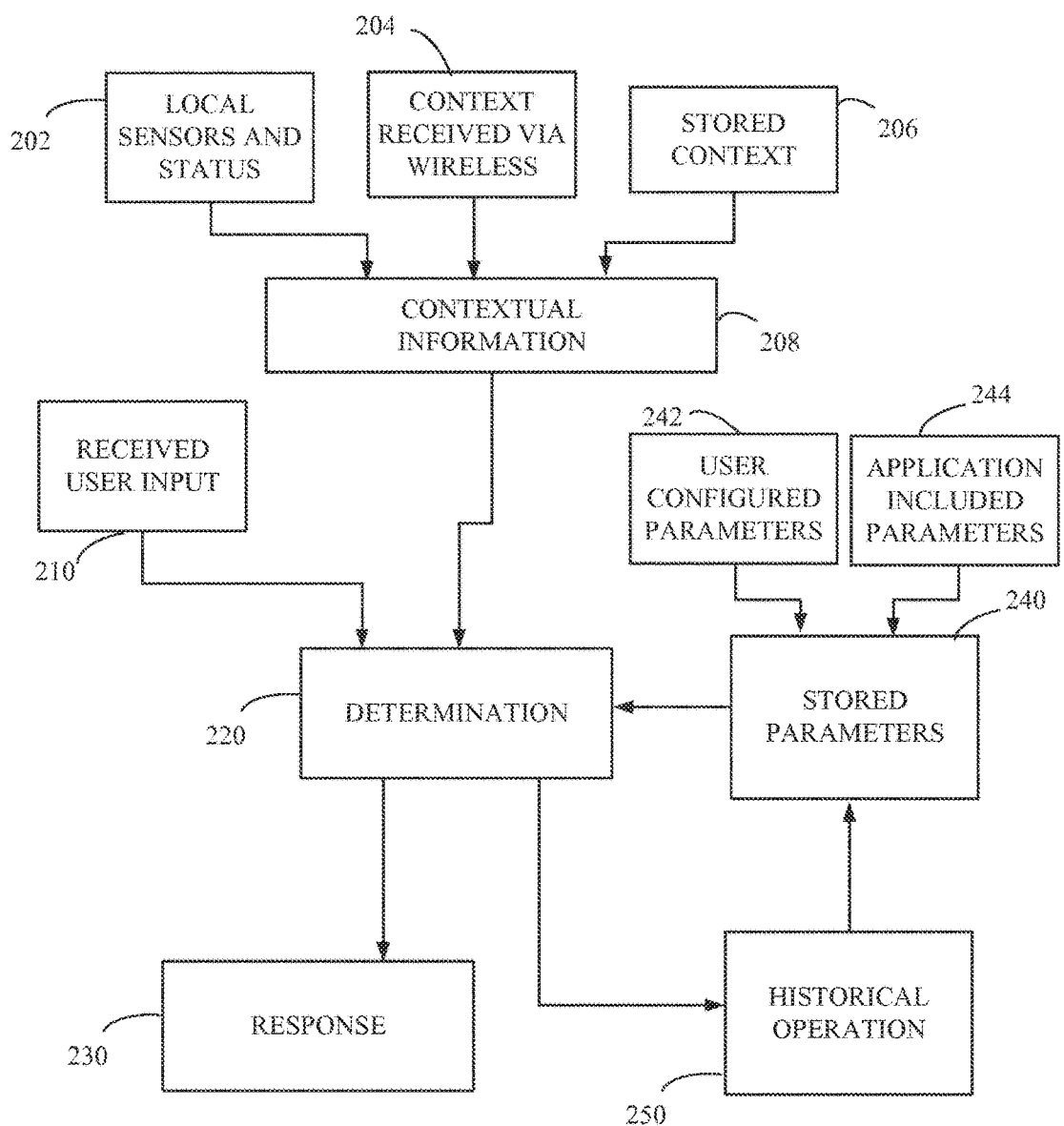
FIG. 2 is a block diagram illustrating information flow and processing in an accessory device in accordance with an exemplary embodiment.

FIG. 2 is a block diagram illustrating information flow and processing within a device such as devices 110 and 150 discussed above with respect to FIG. 1. The blocks included in FIG. 2 represent information sources as well as blocks in which information is processed in order to determine an appropriate response. While FIG. 2 includes many different information sources and processing options, it should be understood that various subsets of these blocks and processing operations can exist in other embodiments. Moreover, while single instantiations of certain blocks are illustrated FIG. 2, one of ordinary skill in the art appreciates that multiple instantiations of the different blocks may be present in different embodiments.

A system corresponding to the information processing illustrated in FIG. 2 utilizes contextual information to determine an appropriate response. As discussed above with respect to FIG. 1, the system can include two or more devices. In one specific embodiment, one device is a smartphone and the other device is a smartwatch. For purposes of illustration, such an example embodiment is assumed in the discussion of FIG. 2. While such a specific embodiment is used to promote ease of understanding with respect to the techniques and other operations disclosed herein, it should be understood that other using devices other than smartphones and smartwatches are contemplated in the discussion presented herein.

Block 208 represents contextual information that may be collected and used by one or more of the devices in the system. The contextual information 208 includes information 202 from local sensors present on the device, as well as status information pertaining to the device or the user of the device. Potential local sensors include those discussed above, where if the device is a wearable device, additional sensing operations are possible based on the wearable device being physically in contact with a user.

Additional contextual information 204 is provided over a wireless link. Such wireless contextual information may be provided, for example, to a smartphone by a smartwatch with which the smartphone is paired. Similarly, the smartphone can provide contextual information to the smartwatch. In one example, the smartphone provides GPS information to the smartwatch, and the smartwatch provides biometric contextual information to the smartphone. In other embodiments, the contextual information may be provided to the device from the network. For example, contextual information may be sent over a cellular or WIFI network to a smartphone. Examples of such information include information relating to the score of a game, the number of cars in a parking lot, the price of something, weather information. In other examples, information sent to the smartphone over such a network may be relayed by the smartphone to the smartwatch for use thereby.

Contextual information 206 is stored on the device. Stored contextual information 206 may include information such as the identity of the user, calendar events, preferences, and the like. The stored contextual information may be directly entered by user or, in other embodiments, may be based on historical usage or distillation of information provided or generated for other purposes on the device.

Thus, block 208 represents collection of available contextual information that can be used by the device. Such information is preferably collected and provided in an easy to access form, thereby enabling ease of use by third party developer applications. In order to aid in explaining various aspects of the embodiments disclosed herein, many examples of potentially useful contextual information, in addition to those already recited above, are provided. Such examples include: a listing of devices within communication range using wireless interfaces (e.g. Bluetooth, WIFI), activities a user may be engaged in based on sensors (e.g. running, swimming, driving), geolocation, time, calendar events, other users in close proximity to the user, user biometrics, a determination of lack of wireless connectivity, a determination as to whether or not a wearable device is currently being worn, the presence of additional accessories or attachments, audio detected via a microphone, input from an olfactory sensor, visual information processed using image recognition, physical proximity detected based on "bump" operations, the presence or absence of various applications on the device and whether or not such applications are active, the current state of a device (e.g. airplane mode, current applications that are active), an account balance or credit card limit, information regarding a previous event or transaction, and other personal information corresponding to the user (e.g. identity, group membership, age). Different contextual information may be useful in different applications, and providing a wide range of such contextual information enables many different applications.

In order to enhance the user experience, the contextual information 208 can be used in conjunction with received user input 210 and stored parameters 240 to determine an appropriate response 230. Such a determination is represented in FIG. 2 by determination block 220. Determination block 220 utilizes received user input 210, contextual information 208, and stored parameters 240 to ascertain whether a response is warranted, and if so, what such a response should be. In some cases, the determination performed may be a comparison between a parameter and contextual information. Some examples include a comparison between the current temperature and a specific value, current heart rate and a stored desired heart rate, and a distance traveled with a minimum distance. In other cases, the determination may require interpretation or processing of the parameters in conjunction with the contextual information. For example, the parameters may provide information to allow the number of calories burned during exercise to be determined, where the contextual information allows the amount of time spent exercising or the intensity of the exercising to be determined. Moreover, the determination performed in block 220 may include multiple separate determinations operating independently to determine multiple possible results. In such an embodiment, the final response 230 determined may include multiple responses determine by the multiple determinations or some subset thereof based on a prioritization or other selection scheme. It should also be appreciated that the determination operation can be distributed amongst multiple devices where the results of each of those determinations may factor into the actual response 230. In some embodiments, the determination may be performed externally from the device such as, for example, by a device or virtual processor accessible over a network. For example, contextual information may be sent out to the network where a determination is made based on the contextual information and parameters that may be sent to the network or already accessible to the network. Having a network service perform some or all of the determination may be advantageous in offloading a device such as a smartphone, smartwatch, or similar device in order to conserve power or provide increased processing power.

The received user input 210 can include, for example, input provided by a button, touchscreen, audio command, or specific movement pattern (e.g. flick of the wrist). In one embodiment, the user input includes an input mechanism that enables a user to select a particular application on a smartphone or smartwatch.

The determination block 220 can also use stored parameters 240 in making its determination. Stored parameters 240 can include user configurable parameters 242 as well as application included parameters 244. Thus, some stored parameters may be accessible to a user such that the user is able to influence what criteria are used in measuring and evaluating the contextual information 208. Similarly, the user configurable parameters 242 allow the user to indicate what contextual information has greater or lesser importance by determining how much weight different parameters are given in determining an appropriate response.

The application included parameters 244 provide third-party developers with the ability use available contextual information 208 in their applications, where such parameters included in the application can influence or direct the actions of the device based on contextual information. For example, an application may include a list of parameters corresponding to available contextual information, where when the current user context meets all of the parametric requirements, the application is launched automatically. For example, an application corresponding to an electronic lock that allows a user to unlock a door may automatically launch if it is determined that the user is physically located in front of the door, the door is locked, and the user's calendar indicates the user is expected at a meeting within the building in the near future. In such an instance, when the contextual information indicate such conditions exist, an application may be launched that allows the user to control the lock, or, in other embodiments, biometric sensors or other means may confirm the user's identity and then unlock the door without any user interaction. In such embodiments, the communications controlling the door may be directly between the user device (e.g. smartphone, smartwatch, etc.) and the electronic lock. As such, the electronic lock may be similar to device 170 discussed with respect to FIG. 1, where the electronic lock may not be network connected but may be capable of establishing communication links such as a Bluetooth or WIFI link.

In one embodiment, many applications are included on the device, and a determination is made based on the contextual information as to which of those applications is the most appropriate to launch or utilize. For example, parameters corresponding to two separate applications may result in a determination that the particular contextual information currently available indicates that both applications are relevant and should be launched or used to perform some action. In such an instance, a further determination may reveal that one of the applications is more relevant than the other, thereby resulting in only the more relevant application being activated or utilized. As discussed below with respect to the historical operation block 250, whether or not such a determination was correct can be taken into account in future decision making, thereby either reinforcing or altering the decision-making process to best suit the user's needs.

Response block 230 indicates the result of the determination block 220. For example, in the example of the application corresponding to an electronic lock discussed immediately above, the result may include launching the electronic lock application and unlocking the door. Based on the same contextual input leading to the door being unlocked, it may also be determined that personal calls directed to the user should be sent straight to voicemail, thereby ensuring the user arrives at the meeting on time and is not interrupted during the meeting. In such a case, the device may prompt the user prior to authorize forwarding all such calls to voicemail, enabling the user to agree with such a response or override it.

In other embodiments, contextual information may lead to doing something other than launching an application. In one example, an active telephone call with a person, contacts information on the device, and user configurable parameters result in a determination that a picture of the person is to be displayed on a smartwatch. Other example responses that may result from a determination using contextual information include displaying text, displaying images, playing video, outputting a sound, providing a physical alert (e.g. vibration, light), and launching a complementary application.

Historical operation block 250 allows for the utilization of feedback to update the stored parameters 240 in order to revise and hone the appropriate response to a selected set of contextual information. For example, if the determination block 220 determines that an electronic lock application should be launched, and the user immediately utilizes that application, the likelihood of the electronic lock application being launched may be increased or expanded such that it is launched based on less stringent parametric requirements. However, if the determination block 220 determines that the electronic lock application should be launched, and the user does not utilize the application, the stored parameters may be updated to make it less likely that the electronic lock application is launched under similar circumstances. The historical operation block 250 enables the system or device to ascertain whether or not the responses generated are appropriate, and adapt future responses based on such historical information. The feedback taken into account can include direct input from the user (e.g. response to a query as to whether or not to do something), observation of actual actions taken by the user (e.g. the user utilized the launched application or not), or feedback generated by an application or other software executing on the device that indicates whether or not the response was appropriate. Moreover, the feedback and historical operation information obtained from actions based on contextual information may also be output by the device or system to a network. For example, an application developer may be interested in whether certain actions are taken by a user after a particular response to contextual information is implemented. The feedback from multiple users could also be aggregated to provide feedback indicating the tendencies of larger groups of users, which may be useful to application developers or others. Thus, the feedback may not only be used locally, but also output to the network.

Figure 3:
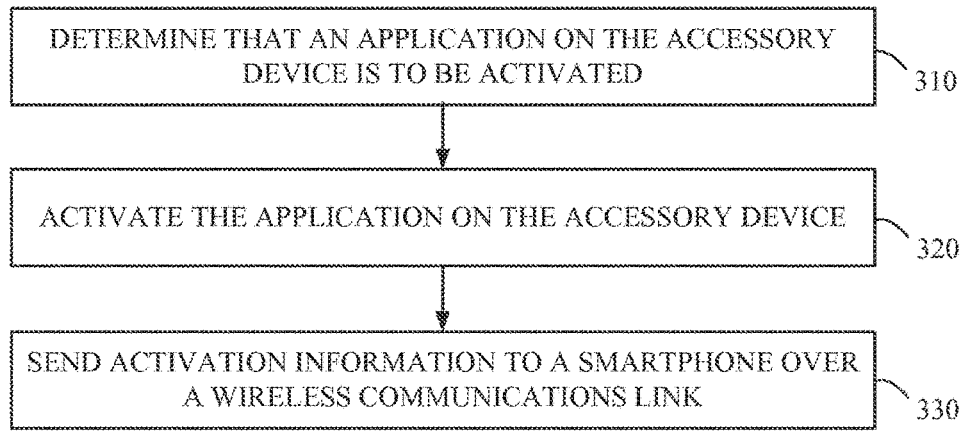
FIG. 3 is a flow chart of a method of operation of an accessory device in accordance with an exemplary embodiment.

FIG. 3 illustrates a flow diagram of a method of operation of an accessory device. As noted above, the accessory device may be a smartwatch or other wearable device that is paired with another device such as a smartphone, tablet, or laptop. At step 310, the accessory device determines that an application on the accessory device is to be activated. The determination performed at step 310 may include receiving input from an input mechanism on the accessory device where the input mechanism enables a user to select a particular application on the accessory device. The determination performed at step 310 may also include using contextual information to determine that a particular application on the smartwatch is to be activated. As discussed above with respect to FIG. 2, a wide variety of contextual information can considered when determining whether or not a particular application is to be launched. In the case where the accessory device is a wearable device, the contextual information can include information based on the accessory device being physically in contact with the user of the accessory device.

During determination step 310, contextual information can be compared with or processed in conjunction with stored parameters on the accessory device in order to ascertain that a particular application is to be activated. As noted above with respect to FIG. 2, some of those stored parameters may be user configurable parameters, other parameters may be included with the application when installed on the accessory device, and yet other parameters may be accessed over a network connection. As also discussed above with respect FIG. 2, the stored parameters can include parameters that are determined or adjusted based on historical operation of the accessory device. Such a feedback mechanism helps to ensure that relevant actions are taken in response to the contextual information.

In using the contextual information and stored parameters to make a determination on the accessory device, the determination that a particular application on the accessory device is to be activated can include selecting the application from a plurality of applications installed on the accessory device. In such instances, the selected application is selected from the plurality of applications based on the contextual information and stored parameters, where in some embodiments a comparison may determine the appropriate response, whereas in other embodiments, the determination may include processing operations that include the contextual information and stored parameters. For example, the stored parameters may reflect that one application, while relevant, is not as relevant as another application.

At step 320, the application for which the determination was made is activated on the accessory device. In some embodiments, the application may be activated based on contextual information without any user input, thereby providing to the user information or capabilities suited to the user's needs based on the user's current situation and surroundings. By anticipating the user's needs based on the contextual information provided, the accessory device enhances its own utility as well as the utility of the associated smartphone or other device.

At step 330, activation information is sent from the accessory device using a wireless communications link. The activation information sent by the accessory device is directed to the smartphone with which the accessory device is paired, where the activation information indicates to the smartphone that an application on the smartphone corresponding to the application activated on the smartwatch should also be activated or utilized for some purpose if already activated. Thus, the determination that a particular application on the accessory device should be launched also causes activation or use of a corresponding application on the smartphone. For applications that include executable portions corresponding to each of the smartphone and the accessory device, the corresponding application activated or utilized on the smartphone can be the smartphone-specific portion of the application where the application activated on the accessory device is the accessory-device-specific portion of the same application. In other embodiments, the corresponding application on the smartphone may be an application that complements the application activated on the accessory device.

Figure 4:
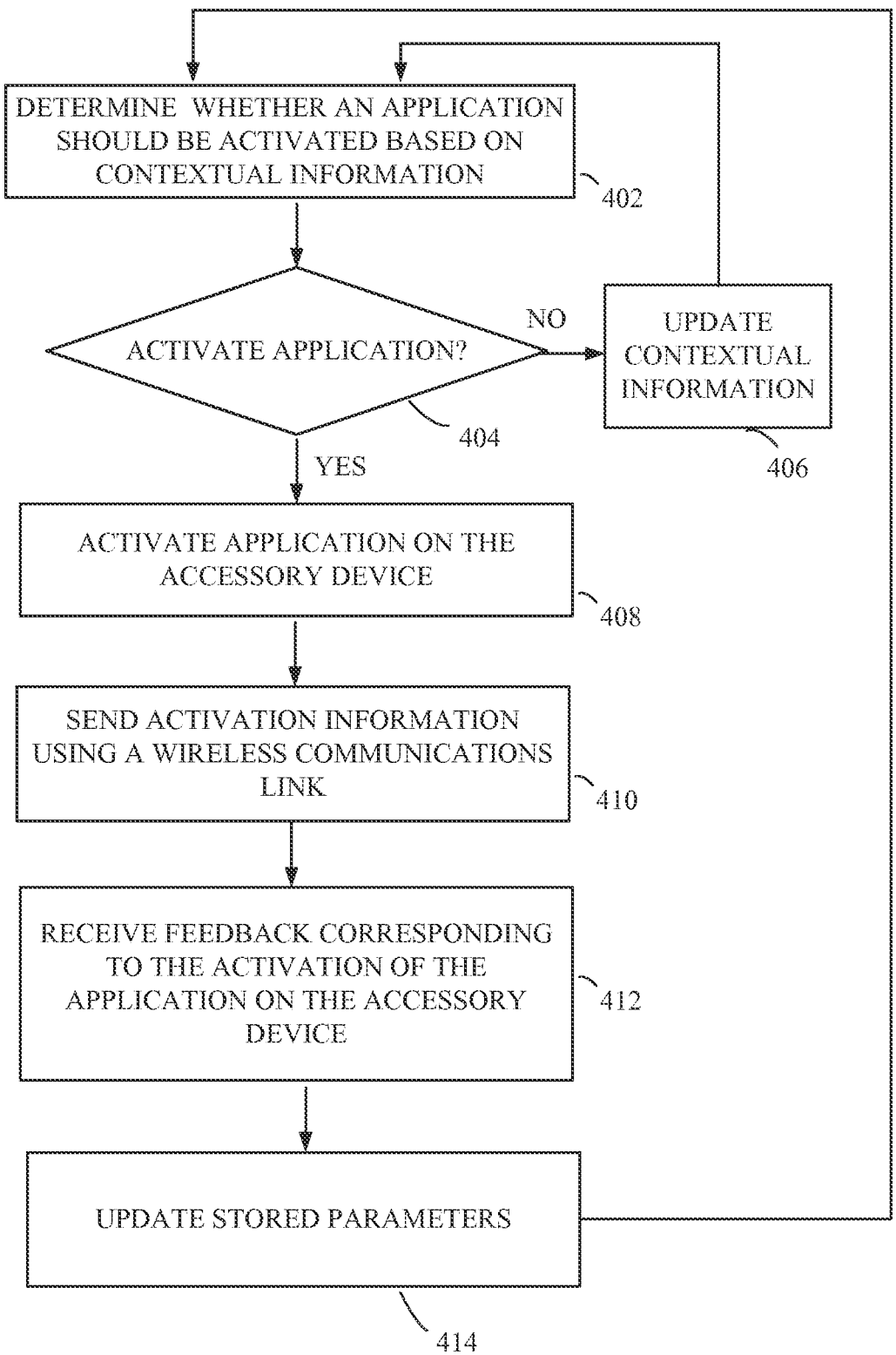
FIG. 4 is a flow chart of a method of operation of an accessory device in accordance with another exemplary embodiment.

FIG. 4 illustrates a flow diagram of a method of operation of accessory device having a wireless communications link, where the accessory device communicates with another device such as a smartphone, tablet, or laptop. At step 402, the accessory device makes a determination using contextual information in conjunction with stored parameters on the accessory device. The contextual information used in the determination may include the various forms of contextual information discussed above, including contextual information that is specific to a wearable device based on its proximity to the user's body and expected movement in coordination with the portion of the body to which it is attached. For example, if the accessory device is a smartwatch, the smartwatch may be able to detect the user's body temperature, heart rate, and whether the user is running, walking, swimming, or performing some other activity. Other forms of contextual information include information received over a wireless link from, for example, a network or another device that includes sensors such as a remote temperature monitor. The contextual information can also include user specific information such as identity, group membership, etc.

The stored parameters used in the determination operation with the contextual information can include user configurable parameters, parameters associated with a particular application that has been installed on the accessory device, or parameters sourced from a network. For example, it may be appropriate to activate a particular application when the user is determined to be jogging. In such an example, the user may provide additional parameters that indicates the application should only be launched when the user has been jogging for a certain period of time or at a certain rate of speed. Thus, the stored parameters can include both user-configurable and application-specific parameters.

At step 404, it is determined whether or not a particular application should be activated. If not, the method proceeds to step 406, where the contextual information involved in the first determination operation is updated based on newly received information. For example, the user's position may change, the ambient temperature may rise, the smartphone with which the accessory device is paired may exit airplane mode, etc. Following the updating at step 406, the method returns to step 402 where another determination operation is performed using the contextual information and the stored parameters.

If it is determined at step 404 that a particular application should be activated, the method proceeds to step 408 where that application is activated. In some embodiments, the determination as to whether or not an application should be activated at step 404 may apply to multiple applications such that multiple applications are activated at step 408. In other cases, while it may be appropriate to activate multiple applications, resources may only permit a subset of those applications to be activated, thereby causing further selection to be performed.

Following activation of the application at step 408, the method proceeds to step 410 where activation information is sent from the accessory device using the wireless communications link provided on the accessory device. The activation information sent by the accessory device is directed to a smartphone to indicate to the smartphone that an application on the smartphone corresponding to the application on the accessory device should be activated or utilized. As such, the operations of the smartphone and accessory device are coordinated in a manner that requires less user interaction.

At step 412, feedback is received, where the feedback indicates whether the application activated at step 408 was useful or appropriate. For example, if the application is immediately closed by the user, the feedback would indicate that the activation of that application may not have been desirable. In contrast, if the user immediately utilizes the application upon activation, such positive feedback indicates that the determination performed earlier that led to the activation was valid. The feedback is used at step 414 where the stored parameters are updated in order to reinforce the activation determination or to prevent it from occurring in the future. In some embodiments, the feedback may reduce the probability of a certain application being activated while at the same time increasing the probability of a different application being activated. The feedback and parameter adjustment may also apply to the smartphone application for which the activation information was sent. For example, if activation information is sent to the smartphone at step 410 indicating that a particular application on the smartphone is to be activated, and it is determined that such activation was not desirable, the stored parameters may be updated to indicate that the smartphone application should not be activated in the future based on the same or similar contextual information. As also discussed above, it may be appropriate to output the feedback information to the network for external use by others. Feedback information from many users can be aggregated to determine group trends or other multi-user dynamics that may be used to adjust parameters included with future revisions of certain applications.

Figure 5:
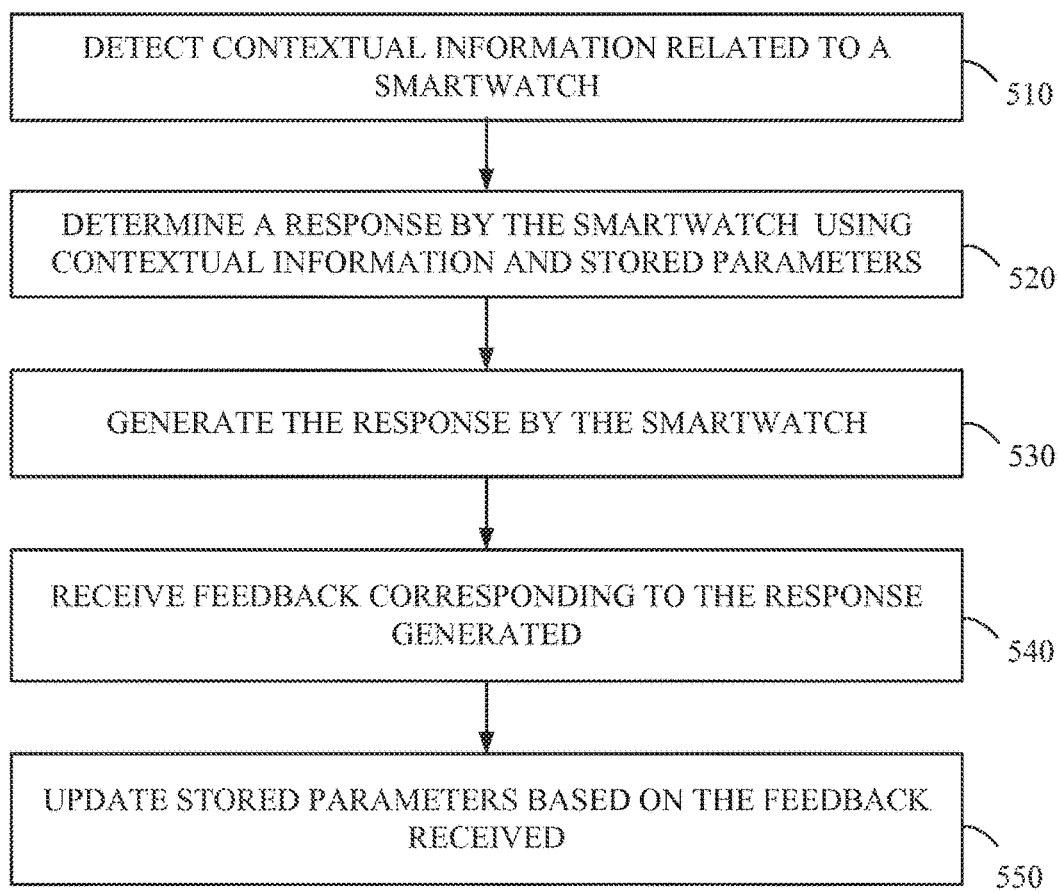
FIG. 5 is a flow chart of a method of operation of a smartwatch in accordance with an exemplary embodiment.

FIG. 5 illustrates a flow diagram corresponding to a method of operation of a smartwatch. In one embodiment, the smartwatch has a Bluetooth connection to a smartphone, where the smartwatch is able to access a network such as the Internet using the resources of the smartphone. For example, the smartphone may be able to connect to WIFI or the Internet via a cellular connection whereas the smartwatch may be limited to Bluetooth connectivity. It should be noted that even if both devices have network connectivity (e.g. Internet access), the interactions between the devices discussed herein are still useful and there is no requirement that one device leverage the network connectivity of the other device. In other embodiments, applications are downloaded by the smartphone via its network connection, where such applications include respective portions for execution on the smartphone and the smartwatch. In such embodiments, once the application is downloaded, it can be parsed such that the appropriate data is forwarded to the smartwatch for installation of its respective portion of the application.

In a system including a smartwatch paired with a smartphone, each of the two devices may include unique sensors, stored contextual information, and access to other devices from which further contextual information can be obtained. In such a system, when a user has turned his wrist to look at the smartwatch, it is desirable to display content on the smartwatch that is relevant to the user at that particular point in time. The information displayed can be determined based on the contextual information reflecting the state of the user and the user's environment at the particular point in time at which the user looks at the smartwatch. In other embodiments, the response to a particular user action may be something other than displaying a particular set of information. For example, an application may be launched, a particular song played, or some specific information may be sent from the smartwatch or smartphone to some other user or device.

At step 510, contextual information related to the smartwatch is detected. For example, sensors on the smartwatch may provide contextual information relating to the user or the user's environment. In some embodiments, multiple sensors on the smartwatch may provide different types of contextual information. Some contextual information may be based on the smartwatch being physically in contact with the user of the smartwatch. Other contextual information may be received via a wireless transmission from an external device (e.g. smartphone, remote sensor) by the smartwatch, where the wireless transmission provides some or all of the contextual information detected. In a specific example, the wireless transmission may be received from a smartphone, where the smartphone may have obtained the contextual information based on internal sensors or from other sources, including those accessed over a network connection provided by, for example, WIFI or a cellular connection.

At step 520, a determination is made using the contextual information detected at step 510 and stored parameters on the smartwatch. As discussed above, the stored parameters can include user configurable parameters, parameters included with the application when installed on the smartwatch, or parameters received over a network connection. The stored parameters can also include parameters determined from historical operation of the smartwatch. For example, if the user of the smartwatch repetitively performs certain routines in terms of starting up applications, the smartwatch can monitor such patterns and use them to influence how contextual information is evaluated in the future. This can be accomplished by updating or modifying the stored parameters in response to the historical operation of the smartwatch.

At step 530, the determination result obtained at step 520 is used to generate a response by the smartwatch. The response can include providing an alert on the smartwatch, changing a graphic display on the smartwatch, and sending data to a device (e.g. smartphone). In some embodiments, the response can include activating an application on the smartwatch. Specific examples of responses that may be performed by the smartwatch include those discussed above with respect to the broader category of accessory devices.

At step 540, the smartwatch receives feedback corresponding to the response generated at step 530. For example, the smartwatch made determine that a user has immediately closed an application which was started at step 530. As another example, the smartwatch may detect that the user has utilized the response provided at step 530 in a way that indicates it was a valuable response to the user. Based on the feedback received at step 540, the stored parameters on the smartwatch are updated at step 550. As noted above, depending on whether or not the response was deemed helpful to the user based on the feedback, the stored parameters can be updated to reflect the value of the response such that future response determinations take into account the feedback received.

Figure 6:
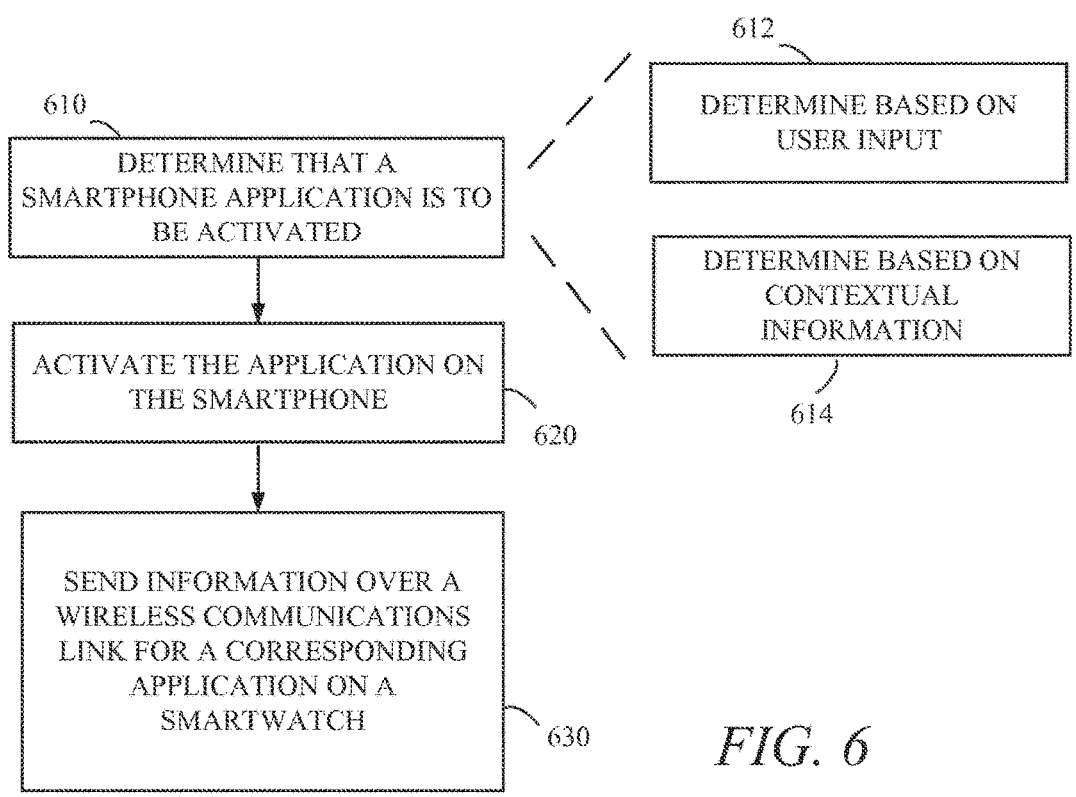
FIG. 6 is a flow chart of a method of operation of a smartphone in accordance with an exemplary embodiment.

FIG. 6 is a flow diagram illustrating a method of operation of a smartphone. At step 610, it is determined by a smartphone that an application on the smartphone is to be activated. Such a determination may include step 612 at which the determination is based on input received from a user of the smartphone. For example, the user may select a particular application using a touchscreen or by voice command. In other embodiments, the determination at step 610 may include step 614 at which the determination is based on contextual information. As discussed in detail above, such contextual information can be compared with configurable stored parameters to determine that an application should be activated.

At step 620, the application is activated on the smartphone. At step 630, information is sent from the smartphone using a wireless communications link. The information sent is directed to a smartwatch to indicate to the smartwatch that an application on the smartwatch corresponding to the application on the smartphone should be activated or that the information should be used by the smartwatch for some other purpose. For example, the information sent from the smartphone may be used by the smartwatch to generate a particular display, provide an audible alert, generate a vibration, or perform some other action. Thus, in one embodiment, when an application is launched on the smartphone, a corresponding application on the smartwatch is automatically launched without further user interaction required. The information sent by the smartphone that results in activation of the application on the smartwatch may also include information regarding certain variables or other aspects useful to the application running on the smartwatch.

The application on the smartwatch corresponding to the activation information sent by the smartphone at step 630 may be a component of an overall application that includes portions that execute on each of the smartphone and the smartwatch, respectively. In other embodiments, the application launched on the smartwatch may be a universal application that would be appropriate for many different applications installed on the smartphone. For example, there may be a "display picture of relevant person" application on the smartwatch, where different applications on the smartphone could utilize the "display picture of relevant person" application. In such an example, if the user of the smartphone is playing a game with a particular person, the display on the smartwatch may show a picture of that person. Similarly, if the user receives a text message from a particular person, the same application may be used to show a picture of that person on the smartwatch.

In other embodiments, the particular application launched on the smartwatch may be determined based at least in part on user settings. Thus, the user can select actions are performed by the smartwatch in response to an activation of a particular application on the smartphone. For example, the user can configure the system to cause the smartwatch to perform some action (e.g. vibrate, flash a light, make a sound, or display particular information) in response to an application being launched on the smartphone.

In one example illustrating the use of the method depicted in FIG. 6, a user that is beginning a jogging exercise routine provides input indicating that an application used to track the user's progress with respect to the routine is to be launched. Such an application may also monitor statistics related to, for example, the user's speed or heart rate. In response to the user input, the relevant application is activated on the smartphone. In addition to launching the application on the smartphone, activation information is sent over a wireless communication link to a smartwatch, where the activation information sent to the smartwatch activates an application on the smartwatch. The application on the smartwatch utilizes one or more sensors on the smartwatch to gather information relevant to the application executing on the smartphone, where the smartwatch sends that information back to the smartphone. The application on the smartwatch may also display, for example, an odometer corresponding to the distance traveled or a timer associated with the length of time the runner has been jogging. Such information may be based on sensors on, or calculations performed by, the smartphone. In a similar example, rather than initiating activation of the application on the smartphone in response to user input, the smartwatch or smartphone may detect that the user has begun jogging, and the application may be activated on the smartphone in response to such detection.

By automatically launching corresponding applications on the smartwatch in response to applications being launched on the smartphone, the user experience is enhanced by reducing the amount of input required by the user. This is an improvement over systems in which the user would have to separately activate an application on the smartphone and then activate a related application on the smartwatch.

Figure 7:
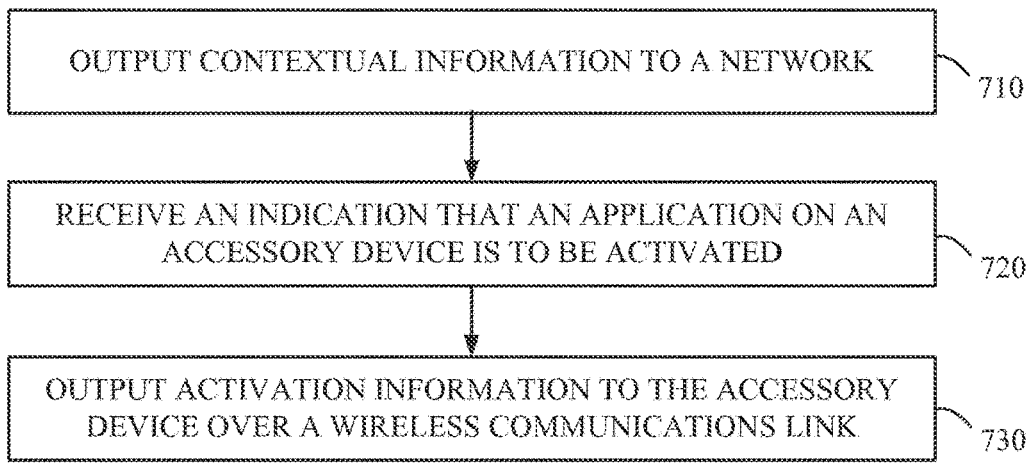
FIG. 7 is a flow diagram illustrating a method of operation of a smartphone.

FIG. 7 is a flow diagram illustrating a method of operation of a smartphone. At step 710, contextual information is output to a network by the smartphone. In some embodiments, the contextual information is generated by sensors on the smartphone, whereas in other embodiments, the contextual information may be received from an accessory device over a wireless network connection. In yet other embodiments, the contextual information may be a combination of contextual information from multiple sources. The contextual information is output to the network for remote processing by another entity coupled to the network. Such a remote entity may include better resources than are available on the smartphone, including access to additional information not directly available to the smartphone. In addition to outputting the contextual information to the network, parameters may also be output to the network, where the parameters are used with the contextual information to determine possible actions to be taken by the smartphone and one or more accessory devices paired with the smartphone.

At step 720, the smartphone receives an indication that an application on an accessory device is to be activated. After providing the contextual information to the network for remote processing, the smartphone receives an indication that the contextual information indicates, based on parameters used to evaluate the contextual information, that an accessory device working in concert with the smartphone should respond in some manner. In the embodiment illustrated in FIG. 7, the response by the accessory device is activating or launching an application on the accessory device. For example, an application for displaying train schedule information may be launched on a smartwatch based on the contextual information output to the network indicating that the user has parked his car at the train station. In other embodiments, an already running application on the accessory device may be provided with data for use by that application, where the data is provided to the accessory device by the smartphone in response to an indication received by the smartphone from the network.

At step 730, activation information is sent from the smartphone using a wireless communications link. The activation information sent is directed to the accessory device indicate to the accessory device that an application on the accessory device should be activated. In other embodiments, rather than sending information that activates an application on the accessory device, information to be used by the accessory device may be sent. For example, the information sent from the smartphone may be used by the accessory device to generate a particular display, provide an audible alert, generate a vibration, or perform some other action.

As discussed above, feedback can be generated based on the actions performed by the accessory device in response to the contextual information processing by the remote entity. That feedback can be used by the accessory device, by the smartphone, by the remote entity, or by other evaluators of similar contextual information in order to refine the actions performed by the accessory device or other devices such that the user experience is improved. The usage of such feedback can include aggregating the feedback with that generated by other devices.

Figure 8:
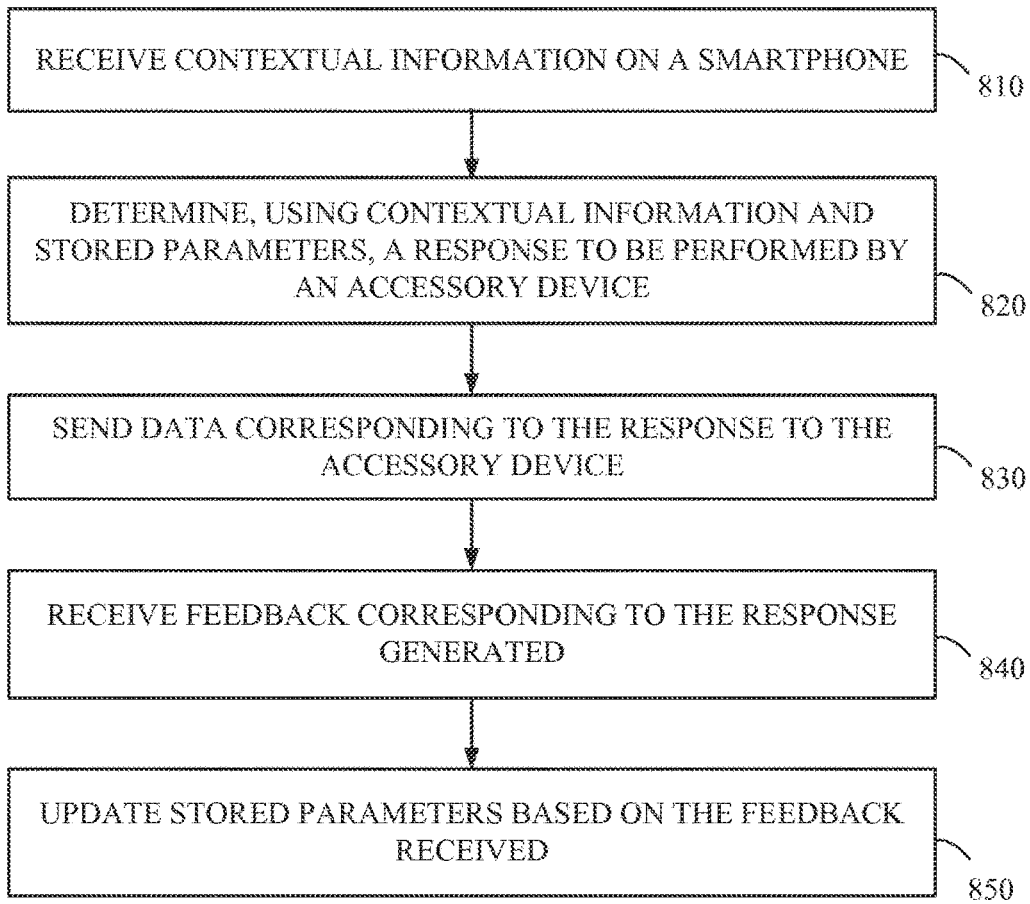
FIG. 8 illustrates a flow diagram corresponding to a method of operation of a smartphone.

FIG. 8 illustrates a flow diagram corresponding to a method of operation of a smartphone. The smartphone works cooperatively with an accessory device such as a smartwatch or another accessory device such as those listed above. Each of the smartphone and accessory device may include unique sensors, stored contextual information, and access to other devices from which further contextual information can be obtained. In such a system, it is desirable to have the accessory device respond to current contextual information in a manner that helps enhance the user's experience with the accessory device. For example, based on certain contextual information received by the smartphone, it may be desirable to have a certain response by the accessory device. Such responses can include, for example, launching an application, displaying information or graphics, providing tactile stimulus, causing an audible alert, etc.

At step 810, contextual information is received by the smartphone. For example, sensors on the smartphone may provide contextual information relating to the user or the user's environment. In some embodiments, multiple sensors on the smartphone may provide different types of contextual information. Contextual information may also be received from the accessory device, where some contextual information may be based on the accessory device being physically in contact with the user. Other contextual information may be received via a wireless transmission from an external device or network.

At step 820, a determination is made using the contextual information received at step 810 and stored parameters on the smartphone. As discussed above, the stored parameters can include user configurable parameters, parameters included with the application when installed on the smartphone, or parameters received over a network connection. The stored parameters can also include parameters determined from historical operation of the smartphone, the accessory device, or similar devices in use by other users.

At step 830, the determination result obtained at step 820 is used to generate a set of data that is output, where the set of data is directed to the accessory device and determines the response by the accessory device. The response can include providing an alert on the accessory device, changing a graphic display on the accessory device, and sending data to a device (e.g. smartphone, electronic lock, car ignition, etc.). In some embodiments, the response can include activating an application on the accessory device. Specific examples of responses that may be performed by the accessory device are discussed in more detail above.

At step 840, the smartphone receives feedback corresponding to the response generated at step 830. For example, the smartwatch made determine that a user has immediately closed an application which was started at step 830. As another example, the smartwatch may detect that the user has utilized the response provided by the data sent at step 830 in a way that indicates it was a valuable response to the user. Based on the feedback received at step 840, the stored parameters on the smartphone are updated at step 850. As noted above, depending on whether or not the response was deemed helpful to the user based on the feedback, the stored parameters can be updated to reflect the value of the response such that future response determinations take into account the feedback received.

As discussed herein, using contextual information in a system that includes a smartphone or similar device that operates in concert with an accessory device can help to enhance the user's experience by predicting the needs of the user based on the contextual information. A variety of user contextual information can be considered, where that contextual information can be provided by sensors or stored data on the devices themselves, by other devices in communication with the devices, or over network connections. Parameters used in processing the contextual information can be pre-set based on the applications downloaded and executed by the user, can be configured by the user itself, or can be provided over network connections. The processing of the contextual information with the parameters may be performed locally by, for example, the smartphone or accessory device, or may be farmed out to remote processors via a network or through direct communication interfaces. After determining the appropriate response to the contextual information, the accessory device or smartphone can be provided with the information needed to execute the appropriate response, which can include launching related applications, displaying particular data, or sending information to other devices to cause those devices to perform some related action. Feedback can be generated based on the responsive actions performed, where such feedback can be used to refine actions taken in the future based on similar contextual information such that it is ensured that the predicted responses taken provide real benefit to the user.

While exemplary embodiments have been presented above, it should be appreciated that many variations exist. Furthermore, while the description focuses in some areas on smartphones and smartwatches in exemplary embodiments, the teachings may be applied to various devices. It should also be appreciated that the exemplary embodiments are only examples, and are not intended to limit the scope, applicability, or configuration of the inventions in any way.

What is claimed is:

1. A wearable device configured to be worn by a user, the wearable device comprising:
   a display;
   at least one sensor configured to generate contextual information associated with the wearable device; and
   at least one processor configured to:
      receive first contextual information generated by the at least one sensor, the first contextual information indicative of a state of the user or the user's environment;
      determine, based at least on the first contextual information and at least one parameter associated with a first application associated with the wearable device, that content associated with the first application is to be displayed on the display;
      cause, in response to the determination, first content associated with the first application to be displayed on the display;
      receive user feedback in response to the first content being displayed;
      determine whether the determination to display the first content was appropriate based at least in part on the user feedback; and
      cause, based at least on the user feedback, the at least one parameter associated with the first application to be updated.

2. The wearable device of claim 1, wherein the user feedback comprises utilization of the first content or the first application, and wherein the at least one processor is further configured to cause, subsequent to receiving the user feedback, content associated with the first application to be more likely to be displayed in response to receiving another instance of the first contextual information.

3. The wearable device of claim 1, wherein the user feedback comprises an action that causes the first content to be no longer displayed on the display, and wherein the at least one processor is further configured to cause, subsequent to receiving the user feedback, content associated with the first application to be less likely to be displayed in response to receiving another instance of the first contextual information.

4. The wearable device of claim 1, wherein the at least one processor is further configured to wirelessly transmit an activation signal to a device paired with the wearable device, such that a second application associated with the device and corresponding to the first application is activated on the device.

5. The wearable device of claim 4, wherein the first application is a wearable-device-specific portion of an application and the second application is a device-specific portion of the application.

6. The wearable device of claim 1, wherein the at least one processor is further configured to determine that content associated with the first application is to be displayed further based at least on a signal from a device paired with the wearable device, the signal comprising second context information generated by the device, the at least one processor further configured to determine that content associated with the first application is to be displayed based at least on the first context information, the second context information, and the at least one parameter associated with the first application.

7. The wearable device of claim 1, wherein the at least one processor is further configured to determine that content associated with the first application is to be displayed further based at least on a signal from a device paired with the wearable device, the signal comprising an indication that second contextual information generated by the device has satisfied one or more criteria associated with the user.

8. The wearable device of claim 1, wherein the at least one processor is further configured to:
   compare the first contextual information with the at least one parameter associated with the first application;
   compare the first contextual information with at least one parameter associated with a second application associated with the wearable device;

determine that the first contextual information is more relevant to the at least one parameter associated with the first application than to the at least one parameter associated with the second application; and based at least on the determination that the first contextual information is more relevant to the at least one parameter associated with the first application, determine that content associated with the first application is to be displayed.

9. The wearable device of claim 1, wherein the at least one processor is configured to update the at least one parameter associated with the first application based at least on prior activations of the first application that were initiated based at least on a determination of an indication of an input by the user such that, subsequent to the update, the first application is automatically activated based at least on the first contextual information and the updated at least one parameter without determining an indication of an input by the user.

10. The wearable device of claim 1, wherein the at least one sensor comprises one or more of a global positioning system (GPS) sensor, a gyroscope, an accelerometer, a magnetometer, a microphone, a proximity sensor, an illumination sensor, an altimeter, a gravity sensor, a temperature sensor, a pressure sensor, a humidity sensor, or an orientation sensor.

11. The wearable device of claim 1, wherein the first contextual information is indicative of a rate of movement of the user, and the at least one parameter includes a threshold rate of movement, the at least one processor further configured to determine that content associated with the first application is to be displayed based at least on the rate of movement exceeding the threshold rate of movement.

12. The wearable device of claim 1, wherein the first contextual information is indicative of a time period of movement of the user, and the at least one parameter includes a threshold time period, the at least one processor further configured to determine that content associated with the first application is to be displayed based at least on the time period of movement exceeding the threshold time period.

13. A method of operating a wearable device configured to be worn by a user, the method comprising:

detecting a first activation of a first application on the wearable device, the first activation being performed in response to determining an indication of an input by the user;

determining, based at least on first sensor data indicative of a state of the user or the user's environment in which the first activation was performed, at least one threshold for automatically activating the first application, the first sensor data being generated by at least one sensor of the wearable device;

receiving second sensor data generated by the at least one sensor of the wearable device, the second sensor data indicative of a state of the user or the user's environment at a time subsequent to the first activation;

determining that the second sensor data satisfies the at least one threshold for automatically activating the first application;

automatically performing a second activation of the first application in response to the determination that the sensor data satisfies the at least one threshold;

receiving user feedback in response to the second activation;

determining, based at least on one of additional sensor data or the user feedback, that the second activation of the first application was not appropriate; and updating the at least one threshold for automatically activating the first application, such that the second sensor data does not satisfy the updated at least one threshold.

14. The method of claim 13, wherein the additional sensor data generated by the at least one sensor of the wearable device indicates that the user did not utilize the first application subsequent to the second activation of the first application.

15. The method of claim 13, further comprising wirelessly transmitting an activation signal to a smartphone paired with the wearable device such that a second application associated with the smartphone and corresponding to the first application is activated on the smartphone.

16. The method of claim 13, further comprising comparing the second sensor data with the at least one threshold in response to a signal from a smartphone paired with the wearable device.

17. The method of claim 13, further comprising outputting, upon performing the second activation, at least one of a visual alert, an auditory alert, or a haptic alert.

18. A system, comprising:

a wearable device configured to be worn by a user, the wearable device comprising a display, at least one sensor configured to generate contextual information, and at least one processor; and a device paired with the wearable device, the device comprising at least one sensor configured to generate contextual information and at least one processor, wherein the at least one processor of the wearable device is configured to:

receive first contextual information generated by the at least one sensor of the wearable device, the first contextual information indicative of a state of the user or the user's environment;

determine, based at least on the first contextual information and at least one parameter associated with a first application associated with the wearable device, that content associated with the first application is to be displayed on the display;

cause, in response to the determination, first content associated with the first application to be displayed on the display and further cause an activation signal to be wirelessly transmitted to the device;

receive user feedback in response to the first content being displayed;

determine whether the determination to display the first content was appropriate based at least in part on the user feedback; and cause, based at least on the feedback, the at least one parameter associated with the first application to be updated, and wherein the at least one processor of the device is configured to, in response to the activation signal from the wearable device, cause a second application associated with the device and corresponding to the first application to be activated on the device.

19. The system of claim 18, wherein the wearable device is a smartwatch and the device is a smartphone.

20. The system of claim 18, further comprising a sensor device in communication with at least one of the wearable device or the device, wherein the at least one processor of the wearable device is further configured to cause the first content to be displayed further based on second contextual information generated by the sensor device.

* * * * *